United States Patent
Guo et al.

(10) Patent No.: US 11,806,872 B2
(45) Date of Patent: Nov. 7, 2023

(54) DEVICE AND METHOD FOR CONTROLLING A ROBOTIC DEVICE

(71) Applicant: Robert Bosch GmbH, Stuttgart (DE)

(72) Inventors: Meng Guo, Renningen (DE); Mathias Buerger, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 225 days.

(21) Appl. No.: 17/449,143

(22) Filed: Sep. 28, 2021

(65) Prior Publication Data
US 2022/0105625 A1 Apr. 7, 2022

(30) Foreign Application Priority Data
Oct. 7, 2020 (DE) .......................... 102020212658.5

(51) Int. Cl.
*B25J 9/16* (2006.01)
*G06N 7/01* (2023.01)

(52) U.S. Cl.
CPC ............. *B25J 9/163* (2013.01); *B25J 9/1653* (2013.01); *B25J 9/1656* (2013.01); *B25J 9/1661* (2013.01);
(Continued)

(58) Field of Classification Search
CPC ........ B25J 9/163; B25J 9/1653; B25J 9/1656; B25J 9/1661; B25J 9/1664; B25J 9/161; B25J 9/1671; G06N 7/01
See application file for complete search history.

(56) References Cited

U.S. PATENT DOCUMENTS 10,789,543 B1 * 9/2020 Sun .......................... G06N 7/01
2017/0228662 A1 8/2017 Gu et al.
(Continued)

FOREIGN PATENT DOCUMENTS

DE 102016009030 B4 5/2019
DE 102018218081 A1 4/2020
(Continued)

OTHER PUBLICATIONS

Schwenkel et al., "Optimizing Sequences of Probabilistic Manipulation Skills Learned From Demonstration", 3rd Conference on Robot Learning (CORL 2019), pp. 273-282.

*Primary Examiner* — Abby Y Lin
*Assistant Examiner* — Karston G. Evans
(74) *Attorney, Agent, or Firm* — NORTON ROSE FULBRIGHT US LLP; Gerard Messina

(57) ABSTRACT

A device and method for controlling a robotic device. The method includes: training a control model, which includes a parameter model and an object model, including: providing for each initial state-target state pair of a plurality of initial state-target state pairs a control state sequence, including states and transition states, each transition state being assigned a set of task parameters; ascertaining a set of state transition-state-state transition triples, and for each: adapting the parameter model so that the parameter model ascertains a probability distribution for each task parameter from the set of task parameters, which is assigned to the state transition following the state, adapting the object model so that the object model ascertains for each object a probability distribution for the state of the object; and controlling the robotic device with the control model using the trained parameter model and the trained object model.

10 Claims, 7 Drawing Sheets

(52) U.S. Cl.
CPC .............. *B25J 9/1664* (2013.01); *B25J 9/161* (2013.01); *G06N 7/01* (2023.01)

(56) References Cited

U.S. PATENT DOCUMENTS

| | | | |
|---|---|---|---|
| 2019/0321974 A1* | 10/2019 | Leon | B25J 9/1661 |
| 2019/0385061 A1* | 12/2019 | Chaudhury | G06N 7/01 |
| 2020/0070352 A1* | 3/2020 | Larzaro-Gredilla | G06N 7/01 |
| 2021/0387330 A1* | 12/2021 | Mavrin | B25J 9/163 |

FOREIGN PATENT DOCUMENTS

| | | |
|---|---|---|
| DE | 102019131385 A1 | 5/2020 |
| DE | 102019203214 A1 | 9/2020 |
| DE | 102019207410 A1 | 11/2020 |
| DE | 112018007729 T5 | 2/2021 |
| DE | 102019216229 A1 | 4/2021 |
| EP | 3511126 A1 | 7/2019 |
| EP | 3587045 A1 | 1/2020 |

\* cited by examiner

DEVICE AND METHOD FOR CONTROLLING A ROBOTIC DEVICE

CROSS REFERENCE

The present application claims the benefit under 35 U.S.C. § 119 of German Patent Application No. DE 102020212658.5 filed on Oct. 7, 2020, which is expressly incorporated herein by reference in its entirety.

FIELD

Various exemplary embodiments relate in general to a device and to a method for controlling a robotic device.

BACKGROUND INFORMATION

Robotic devices may possess a plurality of skills and are able to execute multiple of these skills in order to carry out a task. The behavior of the robotic device when executing a skill may be a function of a plurality of parameters. The skills to be executed for carrying out a task may, for example, be ascertained with the aid of robot control models. However, the high number of skills in connection with the high number of parameters may result in lengthy analysis times when ascertaining the skills to be executed. If the robotic device is in operation, short analysis times for ascertaining skills to be executed may, for example, be required.

It may further be advantageous to convey robotic capabilities to the robot control model from demonstrations.

The paper "Optimizing sequences of probabilistic manipulation skills learned from demonstration" by L. Schwenkel, M. Guo, and M. Burger, in Conference on Robot Learning, 2019, (referred to hereinafter as reference [1]) describes a skills-centered approach, in which each skill is learned independently under various scenarios, but is not tied to a particular task.

SUMMARY

A method and device in accordance with an example embodiment of the present invention make it possible to ascertain skills for carrying out a task by a robotic device with minimal computational set-up and/or little time expenditure. For example, the example embodiments of the method and the device make it possible to ascertain a skill to be executed by the robotic device for a present state and a target state of a robotic device with little computational set-up and/or little time expenditure. The method and the device may, in particular, provide the skill to be executed using a trained control model. Furthermore, a method and a device are provided, with the aid of which robotic capabilities may be conveyed to the control model from demonstrations.

A robotic device may be any type of computer-controlled device such as, for example, a robot, (for example, a manufacturing robot, a maintenance robot, a household robot, a medical robot, etc.), a vehicle (for example, an autonomous vehicle), a household appliance, a production machine, a personal assistant, an access control system, etc.

The control model generated according to the first example, takes into account, for example, the relationships between a most recently executed state transition (such as, for example, a most recently executed skill) and a subsequently executable state transition (such as, for example, a subsequently executable skill) on the one hand, and the geometric conditions underlying the sequence of these two state transitions on the other hand.

The control model is advantageous, for example, to the extent that no complex calculations are required for ascertaining a sequence of state transitions to be carried out (such as, for example, skills to be carried out, which are able to induce the state transitions to be carried out). For example, a skill to be executed is able to ascertain a skill to be carried out with little time expenditure regardless of a high number of skills, of a high number of parameters and/or a high number of objects involved in the surroundings of the robotic device. The control model further has the effect that no manual selection process is required for selecting a skill to be executed.

The control model is advantageous, for example, to the extent that it may be linearly expanded for additional skills of the robotic device.

Each control state sequence may include an alternating sequence of states and state transitions. The feature described in this paragraph in combination with the first example forms a second example.

In accordance with an example embodiment of the present invention, the control of the robotic device with the control model may include in each state: for each state transition executable in the state, ascertaining a respective set of task parameters in response to an input of the target state and of the state transition with which the state has been reached into the trained parameter model; for each state transition executable in the state, ascertaining a respective probability distribution for every object of the one or multiple objects in response to an input of the target state to the respective states of the other objects of the one or multiple objects, and of the set of task parameters ascertained with the aid of the trained parameter model into the trained object model; ascertaining a probability of each state transition executable in the state using the probability distributions ascertained for the one or multiple objects; and ascertaining the executable state transition having the highest ascertained probability as the state transition to be executed. The features described in this paragraph in combination with the first example or the second example form a third example.

The ascertainment of the respective set of task parameters may include for each state transition executable in the state: ascertaining the respective probability distribution for each task parameter of the set of task parameters; and ascertaining the expected value of the respective probability distribution as the task parameter of the set of task parameters. The features described in this paragraph in combination with the third example form a fourth example.

The provision of a control state sequence for each initial state-target state pair of the plurality of initial state-target state pairs may include: selecting a state transition in a respective state of the robotic device starting with the initial state up to the target state; and ascertaining with the aid of a simulation the set of task parameters assigned to the selected state transition and the state of the robotic device resulting from the state transition. The features described in this paragraph in combination with one or multiple of the first example through the fourth example form a fifth example.

The provision of a control state sequence for an initial state-target state pair may include: ascertaining a plurality of potential control state sequences for the initial state-target state pair, each control state sequence including an alternating sequence of states and state transitions; and ascertaining the potential control state sequence having the shortest sequence of states and state transitions as the control state sequence for the initial state-target state pair. The features described in this paragraph in combination with one or multiple of the first example through the fifth example form a sixth example.

In accordance with an example embodiment of the present invention, the control model may further include for each state transition a robot trajectory model, a precondition model and an end condition model. The training of the control model may further include: providing demonstrations for carrying out every state transition of the state transitions; training the robot trajectory model for each transition state using the demonstrations, each robot trajectory model being a hidden semi-Markov model including one or multiple initial states and one or multiple end states; training the precondition model and the end condition model for each state transition using the demonstrations, the precondition model including for each initial state of the robot trajectory model assigned to the state transition a probability distribution of robot configurations prior to the execution of the state transition, and the end condition model including for each end state of the robot trajectory model assigned to the state transition a probability distribution of robot configurations after the execution of the state transition. The controlling of the robotic device with the control model in each state may include: ascertaining a set of task parameters using the trained parameter model; ascertaining a state transition to be executed using the trained object model; ascertaining a robot trajectory with the aid of the robot trajectory model using the state transition to be executed and the set of task parameters; and controlling the robotic device for executing the ascertained robot trajectory. The features described in this paragraph in combination with one or multiple of the first example through the sixth example form a seventh example.

The learning of the control model from demonstrations has the effect of increasing the learning efficiency (for example, the required computational effort is reduced, for example, the required time expenditure is reduced, for example, the effort in generating learning data or training data is reduced).

The learning of the robot trajectory model from demonstrations further has the effect of significantly increasing the performance (for example, efficiency) with the aid of the learned robot trajectory model when ascertaining the skill next to be executed. This has the further advantage that no complex simulation is required.

The provision of a control state sequence for an initial state-target state pair may include: selecting a state transition in a respective state of the robotic device starting with the initial state up to the target state; ascertaining the set of task parameters assigned to the selected state transition using the precondition model assigned to the selected state transition; and ascertaining the state of the robotic device resulting from the state transition using the end condition model assigned to the selected transition state. The features described in this paragraph in combination with the seventh example form an eighth example.

As described above, the control model may be trained with the aid of the ascertained control state sequences based on previous problems with regard to a present state and a target state and, in the process, take geometric conditions into account so that based thereon the efficiency in the operation of the robotic device may be increased.

A computer program product may store program instructions which, if they are executed, carry out the method according to one or multiple of the first example through the eighth example. The computer program product including the features described in this paragraph forms a tenth example.

A non-volatile memory medium may store program instructions which, if they are executed, carry out the method according to one or multiple of the first example through the eighth example. The non-volatile memory medium including the features described in this paragraph forms an eleventh example.

A non-volatile memory medium may store program instructions which, if they are executed, carry out the method according to one or multiple of the first example through the eighth example. The non-volatile memory medium including the features described in this paragraph forms a twelfth example.

BRIEF DESCRIPTION OF THE DRAWINGS

Exemplary embodiments of the present invention are represented in the figures and explained in greater detail in the following description.

DETAILED DESCRIPTION OF EXAMPLE EMBODIMENTS

In one specific embodiment of the present invention, a "computer" may be understood to mean any type of logic-implementing entity, which may be hardware, software, firmware or a combination thereof. In one specific embodiment, a "computer" may therefore be a hardwired logic circuit or a programmable logic circuit such as, for example, a programmable processor, for example, a microprocessor (for example, a CISC (processor having a large instruction set) or a RISC (processor having a reduced instruction set)). A computer may also include one or multiple processors. A "computer" may also be software, which is implemented or executed by a processor, for example, any type of computer program, for example, a computer program that uses a virtual machine code such as, for example, Java. Any other type of implementation of the respective functions, which are described in greater detail below, may be understood as a "computer" in accordance with an alternative specific embodiment.

When controlling robotic devices for carrying out a task, robot control models may be used in order to ascertain skills, which are executed or intended to be executed by the robotic device for accomplishing the task. If the robotic device is in operation, it may be necessary to ascertain the skills to be executed with a low latency (for example, short analysis times). Various exemplary embodiments relate to a device and to a method for controlling a robotic device, which are able, while taking the task into account, to ascertain with a low latency the skills to be executed by the robotic device. Various exemplary embodiments further relate to a method and to a device, with the aid of which a model for ascertaining the skills to be executed may be generated using demonstrations.

Figure 1:
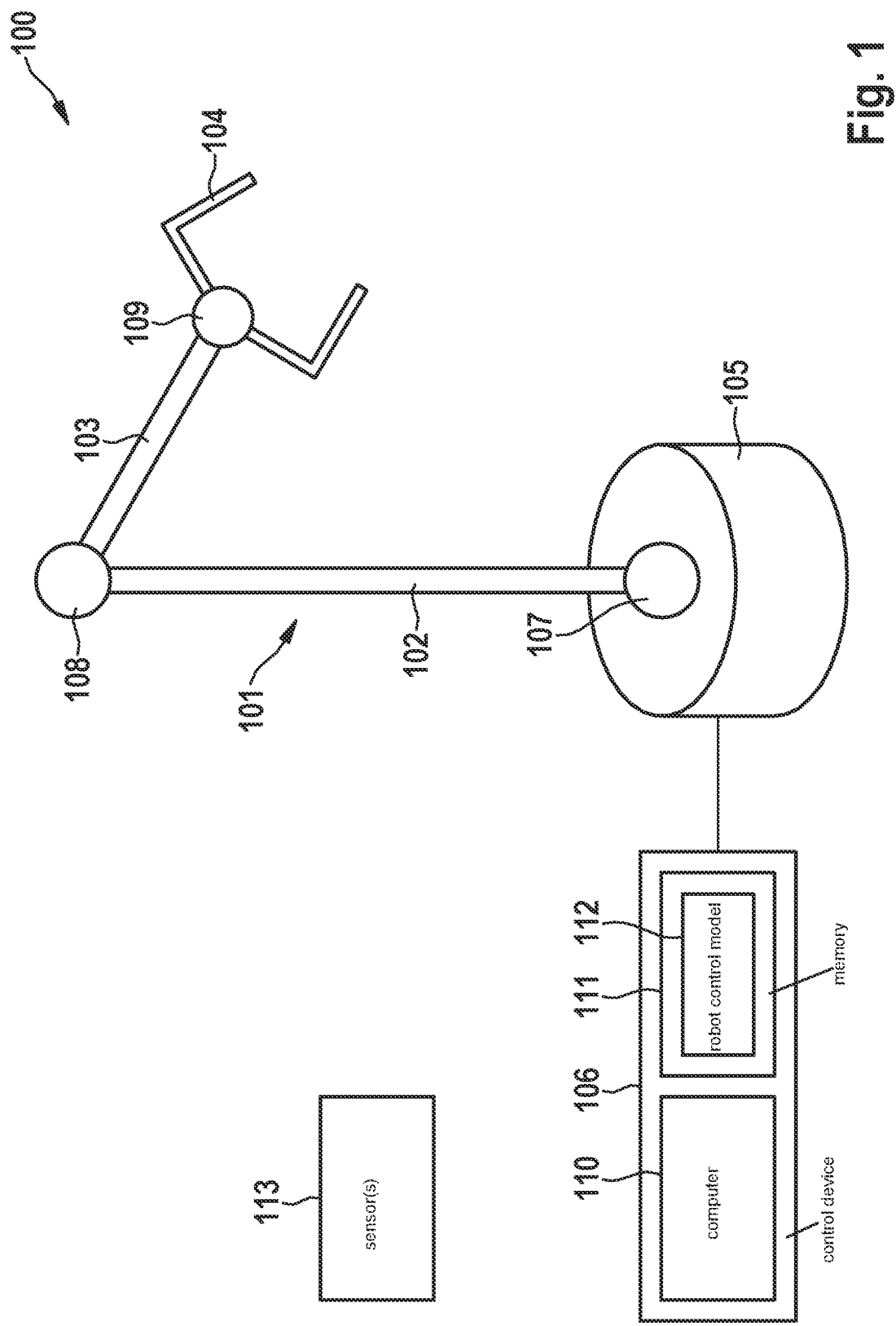
FIG. 1 shows an exemplary robotic device system according to various specific embodiments of the present invention.

FIG. 1 shows a robotic device system 100. Robotic device system 100 may include a robotic device 101. Robotic device 101 shown in FIG. 1 and described by way of example below represents for the purpose of illustration an exemplary robotic device and may include, for example, an industrial robot in the form of a robotic arm for moving, mounting or machining a workpiece. It is noted that the robotic device may be any type of computer-controlled device such as, for example, a robot (for example, a manufacturing robot, a maintenance robot, a household robot, a medical robot, etc.), a vehicle (for example, an autonomous vehicle), a household appliance, a production machine, a personal assistant, an access control system, etc.

Robotic device 101 includes robotic members 102, 103, 104 and a base (or, in general, a holder) 105, by which robotic members 102, 103, 104 are supported. The term "robotic member" refers to the moving parts of robotic device 101, whose actuation allows for a physical interaction with the surroundings, for example, in order to carry out a task, for example, in order to execute or carry out one or multiple skills.

For controlling, robotic device system 100 includes a control device 106, which is configured to implement the interaction with the surroundings according to a control program. Final element 104 (as viewed from base 105) of robotic members 102, 103, 104, is also referred to as end effector 104 and may contain one or multiple tools, such as a welding torch, a gripping tool, a painting unit or the like.

Other robotic members 102, 103 (closer to base 105) may form a positioning device, so that together with end effector 104, a robotic arm (or articulated arm) is provided with end effector 104 at its end.

The robotic arm is a mechanical arm, which is able to perform functions similar to a human arm (possibly including a tool at its end).

Robotic device 101 may include connection elements 107, 108, 109, which connect robotic members 102, 103, 104 to one another and to base 105. A connection element 107, 108, 109 may include one or multiple articulated joints, each of which is able to provide a rotational movement and/or a translational movement (i.e., a displacement) for associated robotic members relative to one another. The movement of robotic members 102, 103, 104 may be initiated with the aid of actuators that are controlled by control device 106.

The term "actuator" may be understood to be a component, which is suitable, in response to being driven, for influencing a mechanism. The actuator is able to convert instructions (the so-called activation) output by control device 106 into mechanical movements. The actuator, for example, an electromechanical converter, may be configured to convert electrical energy into mechanical energy in response to its activation.

The term "control device" (also referred to as "control unit") may be understood to be any type of logical implementation unit, which may, for example, include a circuit and/or a processor, which is able to execute software, firmware or a combination thereof stored in a memory medium, and issue the instructions, for example, to an actuator in the present example. The control device may, for example, be configured to control the operation of a system, in the present case, of a robot, by using program code (for example, software).

In the present example, control device 106 includes a computer 110 and a memory 111, which stores code and data, on the basis of which computer 110 controls robotic device 101. According to various specific embodiments, control device 106 controls robotic device 101 on the basis of a robot control model 112 stored in memory 111.

According to various specific embodiments, robotic device system 100 may include one or multiple sensors 113. The one or multiple sensors 113 may be configured to provide sensor data, which characterize a state of the robotic device. For example, the one or multiple sensors 113 may include an imaging sensor such as, for example, a camera (for example, a standard camera, a digital camera, an infrared camera, a stereo camera, etc.), a radar sensor, a LIDAR sensor, a position sensor, a speed sensor, an ultrasonic sensor, an acceleration sensor, a pressure sensor, etc.

Robotic device 101 may be in one state of a plurality of states. According to various specific embodiments, robotic device 101 may be in one present state of the plurality of states at any point in time. The respective state of the plurality of states may be ascertained using the sensor data provided by the one or multiple sensors 113 and/or by the configuration of robotic device 101.

A state transition may take place between each state and a state following the state. The term "state transition" as used herein may correspond to an action and/or to a skill of robotic device 101. As described, robotic device 101 may perform an action and/or skill in one state, and this may result in a new state of robotic device 101.

Robotic device 101 may be configured to execute a plurality of skills. The skills of the plurality of skills may, for example, be predefined in the program code of control device 106. One or multiple skills of the plurality of skills may, for example, include a mechanical movement of one or of multiple robotic members 102, 103, 104. One or multiple skills of the plurality of skills may, for example, include an action of the end effector (for example, a gripping, for example, a releasing, etc.). According to various specific embodiments, a skill carried out in a present state of robotic device 101 may result in a resulting state of the plurality of states of robotic device 101.

Robot control model 112 may be configured to ascertain a state transition to be executed and control device 106 may be configured to control robotic device 101 for executing the state transition. Robot control model 112 may be configured to ascertain a skill to be executed and control device 106 may be configured to control robotic device 101 for executing the skill.

According to various specific embodiments, at least a part of control model 112 may be configured, for a state of robotic device 101 and a target state of robotic device 101, to provide a state transition to be executed (for example, a skill to be executed). Control model 112 may be configured, for a state of robotic device 101 and a target state of robotic device 101, to provide a skill to be executed and task parameters assigned to the skill. The target state may, for example, be the state in which a task to be carried out is completed or is being completed.

According to various specific embodiments, control model 112 may be generated (for example, trained) while robotic device 101 is not in operation. According to various specific embodiments, generated control model 112 may be used during the operation of robotic device 101 to ascertain skills to be executed by robotic device 101.

Figure 2:
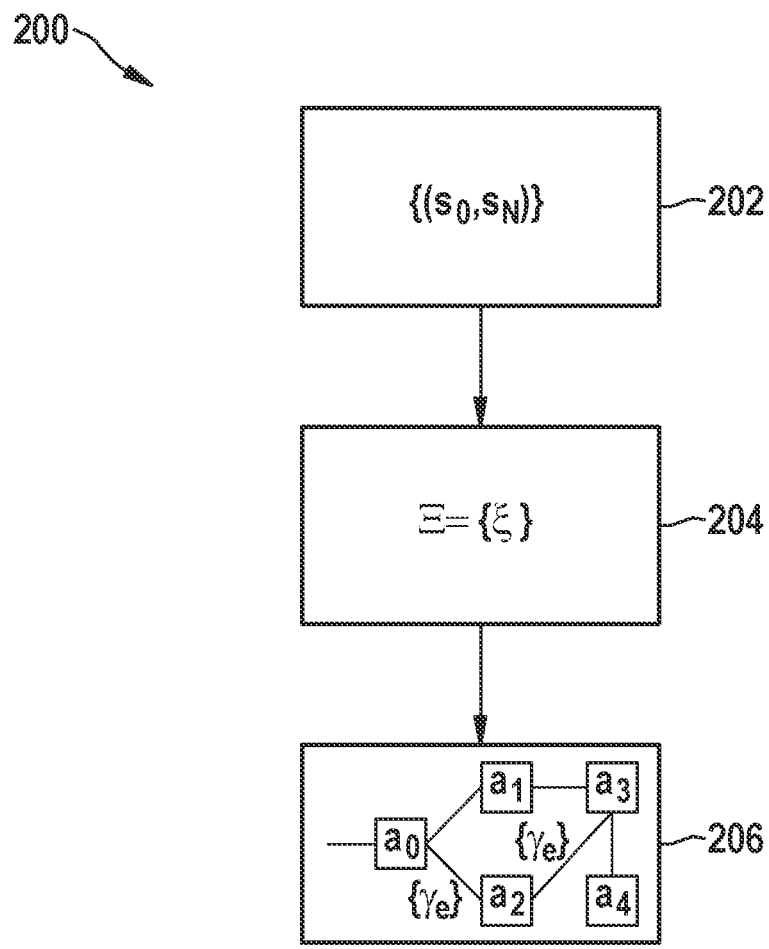
FIG. 2 shows a flowchart for generating a control model according to various specific embodiments of the present invention.

FIG. 2 shows a flowchart 200 for generating a control model 206 according to various specific embodiments. Control model 206 generated in this manner may, for example, be used as control model 112 and/or as a part of control model 112. A computer may be configured to generate control model 206. The computer may, for example, be computer 110 of control device 106. As described herein, control model 206 may also be generated (for example, trained) if robotic device 101 is not operated; thus, for example, the computer may be a computer differing from computer 110. For example, control model 206 may be trained spatially separate from robotic device system 100.

According to various specific embodiments, a plurality of initial state-target state pairs 202 $\{(S_0, S_N)\}$ may be provided (for example, a plurality of initial state-target state pairs 202 $\{(S_0, S_N)\}$ for the same task). According to various specific embodiments, the computer may be configured to select a plurality of initial state-target state pairs 202 $\{(S_0, S_N)\}$. For example, according to various specific embodiments, the computer may be configured to ascertain the plurality of initial state-target state pairs 202 $\{(S_0, S_N)\}$. Each initial state-target state pair $(S_0, S_N)$ may include an initial state $S_0$ and a target state $S_N$. Each initial state $S_0$ may be one state of the plurality of states of robotic device 101. Each initial state $S_0$ may indicate one state of robotic device 101 and one or multiple objects. Each target state $S_N$ may be one state of the plurality of states of robotic device 101. Each target state $S_N$ may indicate one state of robotic device 101 and one or multiple objects. For example, the computer may be configured to select (for example, essentially randomly select, for example, with the aid of a predefined algorithm) each initial state-target state pair $(S_0, S_N)$ from a state space, which includes the plurality of states.

According to various specific embodiments, the computer may be configured to ascertain a control state sequence for each initial state-target state pair $(S_0, S_N)$ of the plurality of initial state-target state pairs 202 $\{(S_0, S_N)\}$. Each control state sequence may include states and state transitions from a set of possible states and state transitions. For example, a plurality of control state sequences 204 $\Xi=\{\xi\}$ may be ascertained for the plurality of initial state-target state pairs 202 $\{(S_0, S_N)\}$. According to various specific embodiments, $\Xi$ may be a database of control state sequences $\{\xi\}$. Each control state sequence of an assigned initial state-target state pair $(S_0, S_N)$ may include an alternating sequence of states and state transitions (for example, skills). Each control state sequence $\xi$ of an assigned initial state-target state pair $(S_0, S_N)$ may include an alternating sequence of states and state transitions from initial state $S_0$ up to target state $S_N$.

For the purpose of illustration, the state transitions are described below with reference to skills of robotic device 101.

As illustrated, a skill $a \in A$ may be executed (for example, theoretically executed) in initial state $S_0$, the skill resulting in a resultant state of robotic device 101, in the subsequent state, a next skill being capable of being executed, etc. Each skill $a \in A$ in this case may be assigned a set of task parameters $TP_a$. The task parameters included in the set of task parameters $TP_a$ may describe the assigned skill according to various specific embodiments.

According to various specific embodiments, a control state sequence $\xi$ of an assigned initial state-target state pair $(S_0, S_N)$ may be described by $$\xi = s_0(a_0, TP_{a_0})s_1(a_1, TP_{a_1})s_2 \ldots s_N \qquad (1).$$

As described, a state transition may be described by an $a \in A$ and the state transition may be assigned a set of task parameters $TP_a$.

According to various specific embodiments, task parameters p of a set of task parameters $TP_a$ may be ascertained using the state of robotic device 101 before the assigned skill (for example, the state before the theoretical execution of the skill).

A control state sequence for an initial state-target state pair $(S_0, S_N)$ may, for example, be ascertained with the aid of a solver for tasks and motion planning (TAMP solver). A TAMP solver may, for example, connect a discrete logical conclusion with geometric conditions with respect to robotic device 101. A TAMP solver may, for example, be implemented as a neural network. According to various specific embodiments, a control state sequence for an initial state-target state pair $(S_0, S_N)$ may be ascertained by a TAMP solver by applying a graph-search algorithm. The graph-search algorithm may, for example, be applied (for example, in the memory of control device 106) to pre-programmed parameters. The graph-search algorithm may, for example, include a breadth-first search, a Dijkstra algorithm and/or an A*-algorithm. In the process, each state transition (for example, each skill) may be executed (for example, theoretically executed) in each present state in order to bring the system into a resulting state.

The set of task parameters $TP_a$ assigned to skill $a \in A$ may, for example, be calculated with the aid of the computer (for example, using the TAMP solver). According to various specific embodiments, the state resulting from a skill may be ascertained with the aid of a simulation. According to various specific embodiments, a control input for the robotic device may be ascertained at little cost in order to (for example, theoretically) execute the state transition with the task parameters of the assigned set of task parameters.

According to various specific embodiments, the set of task parameters $TP_a$ assigned to skill $a \in A$ may be ascertained using a precondition model $\gamma_{1,a}$. According to various specific embodiments, the state resulting from skill $a \in A$ may be ascertained using an end condition model $\gamma_{T,a}$. For each skill, precondition model $\gamma_{1,a}$ may include for each initial state a probability distribution of robot configurations before the execution of the skill. For each skill, end condition model $\gamma_{T,a}$ may include for each state resulting from the skill (referred to in some aspects as the end state) a probability distribution of robot configurations after the execution of the skill. Precondition model $\gamma_{1,a}$ and/or end condition model $\gamma_{T,a}$ may be ascertained with the aid of learning from demonstrations (see in this regard, for example, the description for FIG. 4 and FIG. 5 and reference [1]).

According to various specific embodiments, a plurality of potential control state sequences may be ascertained for each initial state-target state pair $(S_0, S_N)$ of the plurality of initial state-target state pairs 202 $\{(S_0, S_N)\}$. Each potential control state sequence of the plurality of potential control state sequences of an initial state-target state pair $(S_0, S_N)$ may include an alternating sequence of states and state transitions (for example, skills) from initial state $S_0$ up to target state $S_N$. According to various specific embodiments, the potential control state sequence of the plurality of potential control state sequences may be ascertained ξ with the lowest ascertained costs as control state sequence for the initial-target state pair ($S_0$, $S_N$). According to various specific embodiments, the potential control state sequence of the plurality of potential control state sequences having the shortest sequence of states and state transitions (for example, including the fewest states or state transitions) may be ascertained as control state sequence ξ for initial state-target state pair ($S_0$, $S_N$).

Figure 3:
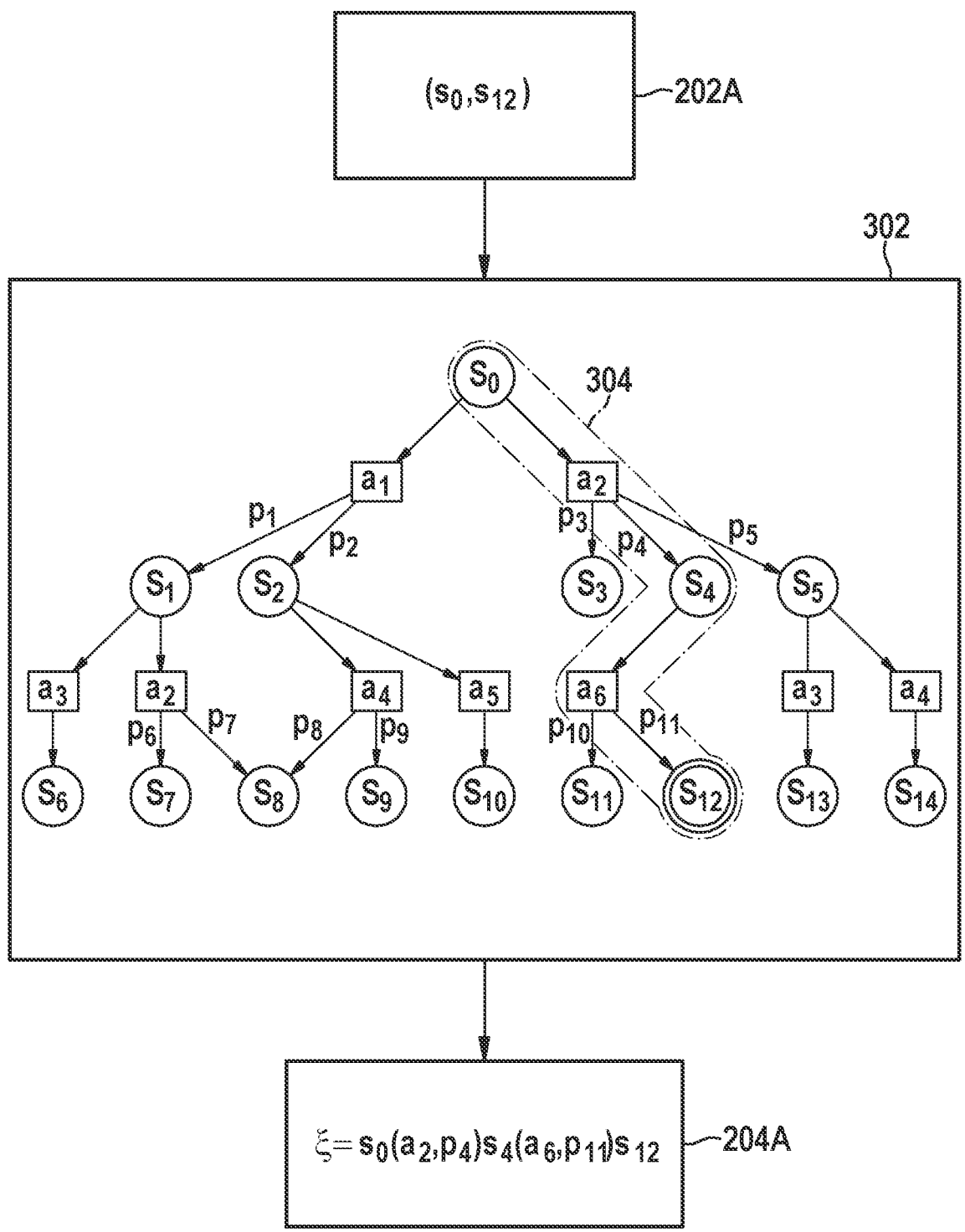
FIG. 3 shows an ascertainment of an exemplary control state sequence according to various specific embodiments of the present invention.

An ascertainment of an exemplary control state sequence 204A is represented in FIG. 3. For example, exemplary control state sequence 204A for initial state-target state pair ($S_0$, $S_{12}$) 202A may be ascertained, the initial state being $S_0=S_0$ and the target state being $S_N=S_{12}$. Exemplary control state sequence 204A may be ascertained using state-state transition diagram 302 represented as illustrated, for example, with the aid of a graph-search algorithm. As described herein, each state transition may be assigned respective task parameters (marked in the state-state transition diagram 302 as p). State-state transition diagram 302 shows a sequence 304 ascertained by way of example of states and state transitions from the initial state up to the target state. Exemplary control state sequence 204A may be described based on this example as follows: $\xi = S_0$ ($a_2$, $p_4$) $s_4$ ($a_6$, $p_{11}$) $s_{12}$.

Referring to FIG. 2, the computer may be configured to generate (for example, to train or to learn) a control model 206 using the ascertained plurality of control state sequences 204 $\Xi = \{\xi\}$. Control model 206 may, for example, be a geometric task model and may take geometric conditions into account when controlling robotic device 101. According to various specific embodiments, control model 206 may be configured to provide (for example, to output) a state transition a* to be executed and a set of task parameters $TP^*_{a^*}$ assigned to the state transition to be executed in response to an input of a present state of robotic device 101 and of a target state. According to various specific embodiments, control model 206 may be configured to provide (for example, to output) a skill a* to be executed and a set of task parameters $TP^*_{a^*}$ assigned to the skill to be executed in response to an input of a present state of robotic device 101 and a target state.

An exemplary generation of control model 206 according to various specific embodiments is described below.

According to various specific embodiments, a virtual initial skill $\underline{a}$ may be added to each control state sequence ξ at the beginning of the control state sequence (i.e., to the sequence of states and skills). A virtual end skill $\overline{a}$ may be added to each control state sequence ξ at the end of the control state sequence. Thus, a control state sequence ξ having a length of N states (with reference to equation (1)) may be described as:

$$\xi = \underline{a} s_0 (a_0, TP_{a_0}) s_1 \ldots (a_{N-1}, TP_{a_{N-1}}) s_N \overline{a} \quad (2)$$

According to various specific embodiments, the computer may be configured to ascertain a set of state transition-state-state transition triples, which are included in the provided control state sequences. According to various specific embodiments, the computer is able to ascertain for each control state sequence of the plurality of control state sequences 204 $\Xi = \{\xi\}$ a set of triples (for example, each triple) provided as state transition-state-state transition (for example, skill-state-skill). As described herein, each skill may be assigned a set of task parameters $TP_a$. A state transition-state-state transition triple (referred to hereinafter also as first triple) may be described by $$((a_n, TP_{a_n}), s_{n+1}, (a_{n+1}, TP_{a_{n+1}})) \quad (3),$$

n being a running index of N.

Each pair of the two state transitions ($a_n$, $a_{n+1}$) of a respective first triple (($a_n$, $TP_{a_n}$), $s_{n+1}$, ($a_{n+1}$, $TP_{a_{n+1}}$)) may, as illustrated, be a sequence of two skills. For the purpose of illustrative description, the two state transitions of a respective first triple are also referred to herein as a skill transition. As illustrated, a skill transition as described herein represents two successively executable (or executed) skills. As a result, each skill transition may be assigned to a transition from skill $a_n$ to a subsequent skill $a_{n+1}$. For example, each skill transition may be assigned to a transition from one skill to a following skill in accordance with the plurality of control state sequences. According to various specific embodiments, the first triples may be a plurality of first triples and a plurality of skill transitions (i.e., a plurality of state transition pairs ($a_n$, $a_{n+1}$) of a respective first triple (($a_n$, $TP_{a_n}$), $s_{n+1}$, ($a_{n+1}$, $TP_{a_{n+1}}$)) may be ascertained using the plurality of first triples. The plurality of skill transitions may be added to a set of skill transitions $\hat{E}$, by which each skill transition may be e∈$\hat{E}$.

According to various specific embodiments, an expanded state set $\hat{S}_{a_n a_{n+1}}$ (in some aspects, also referred to as state dataset) may be ascertained for each skill transition ($a_n$, $a_{n+1}$). Expanded state set $S_{a_n a_{n+1}}$ may include one or multiple expanded states ŝ. According to various specific embodiments, the computer is able to ascertain for each control state sequence of the plurality of control state sequences 204 $\Xi = \{\xi\}$ each triple provided as subsequent state-subsequent task parameters-target state (also referred to herein after as second triple). A second triple may be described by $$(s_{n+1}, TP_{a_{n+1}}, s_N) \quad (4).$$

Each second triple may be an expanded state ŝ of the assigned expanded state set $\hat{S}_{a_n a_{n+1}}$.

According to various specific embodiments, control model 206 may include a parameter model $\gamma_p$ and an object model $\gamma_o$. According to various specific embodiments, the computer may be configured to train a mapping function $f(a_k, a_\ell)$ in order to map from each skill transition (for example, skill $a_k$ onto skill $a_\ell$) onto a respective parameter model $\gamma_p$ and/or a respective object model $\gamma_o$. For example, the trained mapping function $f(a_k, a_\ell)$ is able to map from each skill transition ($a_k$, $a_\ell$) parameter model $\gamma_p$ and object model $\gamma_o$ according to equation (5):

$$f(a_k, a_\ell) = \{\gamma_p, \forall p \in TP\, a_\ell\} \cup \{\gamma_o, \forall o \in O\, a_\ell\} \quad (5).$$

According to various specific embodiments, parameter model $\gamma_p$ may be learned for each task parameter p∈TP$a_\ell$. Parameter model $\gamma_p$ may be a task-parameterized Gaussian mixed model (TP-GMM). Parameter model $\gamma_p$ may be trained for each task parameter p∈TP$a_\ell$ using the set of task parameters {TP$a_\ell$,p} assigned to the following skill of the respective skill transition as observations, and a pair {($s_j$, $s_N$)} made up of state $S_j$ and target state $S_N$ as assigned frames. As illustrated, parameter model $\gamma_p$ describes (for example, models) how the selected task parameters are limited (for example, conditioned) with respect to the present state of robotic device 101 and the target state. As illustrated, parameter model $\gamma_p$ describes how, given the target state, the task parameters in preceding solutions have been selected. It is noted that in these examples, the state of the first triple is identified as $S_j$, so that the first triple is made up of skill $a_k$, state $S_j$ and skill $a_\ell$.

According to various specific embodiments, parameter model $\gamma_p$ may be adapted for each first triple of the set of first triples. According to various embodiments, parameter model $\gamma_p$ may be adapted in such a way that parameter model $\gamma_p$ ascertains a probability distribution for each task parameter from the set of task parameters assigned to the state transition following the state in response to an input of the first triple (of the state transition-state-state transition triple) and of the assigned target state of the control state sequence, in which the first triple is included.

According to various specific embodiments, object model $\gamma_o$ may be learned for each object $o \in O\, a_\ell$. Object model $\gamma_o$ may be a task-parameterized Gaussian mixed model (TP-GMM). Object model $\gamma_o$ may be trained for each object $o \in O\, a_\ell$ as observations using the state of respective object $s_{j,o}$ and as assigned frames using a tupel $\{(s_{j,\neg o}, TPa_\ell, s_N)\}$ made up of the respective state of other objects $s_{j,\neg o}$ (i.e., the objects which do not correspond to object o) of the one or multiple objects $o \in O\, a_\ell$, the set of task parameters TP $a_\ell$ assigned to the following skill and the target state $S_N$. As illustrated, object model $\gamma_o$ describes (for example, models) how the present state is limited (for example, conditioned) with respect to the selected task parameters and the target state. As illustrated, object model $\gamma_o$ describes how probable the transition is given the target state based on preceding solutions. It is noted that in these examples, the state of the first triple is identified as $S_j$, so that the first triple is made up of skill $a_k$, state $S_j$ and skill $a_\ell$ (referred to in some aspects as subsequent skill).

According to various specific embodiments, object model $\gamma_o$ may be adapted for each first triple of the set of first triples. According to various specific embodiments, object model $\gamma_o$ may be adapted in such a way that object model $\gamma_o$ ascertains for each object of the one or multiple objects a probability distribution for the state of the object in response to an input of the two state transitions of the first triple (for example, of the skill transition of the first triple), to the respective states of other objects $s_{j,\neg o}$ of the one or multiple objects, to a set of task parameters and of the assigned target state.

The TP-GMMMs may be learned, for example, with the aid of the EM (expectation maximization) algorithm. TP-GMMs are described in greater detail with reference to FIG. 4 and FIG. 5 as well as in reference [1].

According to various specific embodiments of the present invention, parameter model $\gamma_p$ may be ascertained using precondition model $\gamma_{1,a}$ and/or end condition model $\gamma_{T,a}$ described herein. According to various specific embodiments, object model $\gamma_o$ may be ascertained using precondition model $\gamma_{1,a}$ and/or end condition model $\gamma_{T,a}$ described herein.

As illustrated, trained parameter model $\gamma_p$ may output a probability distribution of how, based on the training data (for example, the control state sequences) in a state, given a target state, the task parameters of the set of task parameters have been selected. As illustrated, trained object model $\gamma_o$ is able to consider how, based on the training data in the state, given the target state, the objects involved in the skill relate to one another when using particular task parameters. Trained object model $\gamma_o$ is thus able to take geometric conditions into account. For the purpose of additional illustration, a robot in one example may have the task of placing a component on a pedestal. In this case, the skill may be the placing of the component onto the pedestal and may be described by task parameters such as, for example, a force, a speed, a rotation, a position of the component, a target position, etc. Trained parameter model $\gamma_p$ may output how the task parameters for the skill have been selected based on the training data. However, also other objects such as, for example, another component in addition to the component, a second robot, also another component on the pedestal, etc.

may be involved in the skill. Trained object model $\gamma_o$ may take these geometric relationships into account and may be used to ascertain a probability with which the skill has been carried out using the task parameters ascertained by trained parameter model $\gamma_p$. For example, trained parameter model $\gamma_p$ may ascertain as an expected value of the respective task parameters a speed and a movement with which the component has been placed onto the pedestal during training. A blocking component may, however, stand between the component and the pedestal and trained object model $\gamma_o$ may ascertain that for this configuration of the components and for these task parameters, the probability that the skill has been carried out is low. On the other hand, another skill may be to move the blocking component away, for this purpose, trained parameter model $\gamma_p$ may ascertain the task parameters and trained object model $\gamma_o$ may ascertain task parameters ascertained for the configuration of the components including the blocking component and for the second skill that the second skill has been highly probably carried out during training. As illustrated, the robot may, for example, ascertain first the second skill for moving the blocking component away and subsequently the skill for placing the component onto the pedestal.

According to various specific embodiments, control model 206 may be generated using the plurality of skill transitions (for example, the set of skill transitions Ê) and the mapping functions $f(a_k, a_\ell)$. For example, the computer may ascertain a network made up of skill nodes V and skill transitions E. The computer may be configured to ascertain skill nodes V and skill transitions E using the set of skill transitions Ê. In this case, for example, the corner points of network (V, E) and/or respective skill transitions $e$ may be derived directly from the set of skill transitions Ê. Skill nodes V may be a subset of skill set A. For example, the set of skill transitions E may be described by E⊆V×V. Mapping function $f$ may, as described herein, map onto the parameter model and the object model and may be described by $f: E \rightarrow 2^{\gamma_s}$. As illustrated, (V, E) describes how the skills may be executed one after another. As illustrated, the mapping function for a skill transition $(a_k, a_\ell)$, i.e., for a $e \in E$, describes (for example, models) the geometric conditions with respect to the objects and to robotic device 101. According to various specific embodiments, the number of components of every TP-GMM (for example, of the parameter model and/or of the object model) within mapping function $f_e$ may correspond to the number of control state sequences (for example, of unique control state sequences, i.e. exactly one control state sequence per unique initial state-target state pair), which include this skill transition $e \in E$.

Control model 206 $\mathcal{G}$ may be generated using network (V, E) and mapping function $f(a_k, a_\ell)$. For example, control model 206 $\mathcal{G}$ may be formed by network (V, E) and mapping function $f(a_k, a_\ell)$, so that control model 206 $\mathcal{G}$ may be described by triple $\mathcal{G} = (V, E, f)$.

A control model 206 generated in such a manner takes into account the possible transitions of skills on the one hand and the geometric conditions underlying these transitions on the other hand, control model 206 being parameterized to the target state. As illustrated, control model 206 generated in this manner is a compact representation for TAMP strategies.

The training (for example, learning) of control model 206 $\mathcal{G}$ described herein using demonstrations $D_a$ (see for example the description relating to FIG. 4 and FIG. 5 and reference [1]) may be described with the aid of algorithm 1:

Algorithm 1: learning of control model $\mathcal{G}$

Input: $D_a$, $\forall a \in A$.
Output: $\Xi$, $\mathcal{G}$.
Learn $\mathcal{M}a$ according to equation (10) for each $a \in A$.
for all $(s_0, s_F)$ do

| find control state sequence according to equation (1)
|_ using a TAMP solver.
    Add $\tilde{\xi}$ to $\Xi$.
Construct $\hat{E}$ and $\{\hat{S}_e, \forall e \in \hat{E}\}$ from $\Xi$.
Create (V, E) from $\hat{E}$.
Calculate $f(e)$ from $\hat{S}_e$ according to equation (5), $\forall e \in \hat{E}$.

$s_F$ being the target state (for example, input target state).

According to various specific embodiments, control model 206 may be trained for a predefined task. According to various specific embodiments, multiple control models may be learned, each control model of the multiple control models being assigned to a respective task.

Figure 4:
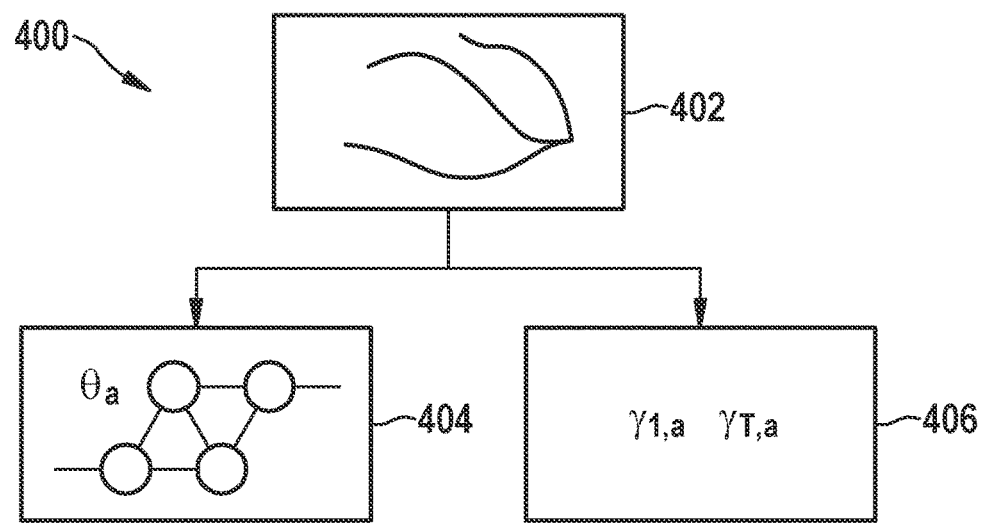
FIG. 4 shows a flowchart of a learning from demonstrations according to various specific embodiments of the present invention.

FIG. 4 shows a flowchart 400 of a learning from demonstrations according to various specific embodiments.

In order to teach a robot a skill such as, for example, to move itself according to a desired trajectory, kinesthetic demonstrations may be carried out, in which the robot is directly moved, for example, by physical pushing or with the aid of a remote control. In addition to the experience required therefor, the safety risks and the demands (for example, for tasks requiring precise movements), the moving of the robot is also much less intuitive for a human in order carry out a task, compared with the use of one's own hands.

With respect to the above, an approach is provided according to various exemplary embodiments, which enables a human user to teach a robot an activity (skill) by simply carrying out the activity him/herself. In this case, demonstrations are recorded, for example, by tracking the hand of the user (and optionally of the objects involved), instead of recording the trajectory of the end effector. Demonstrations are then used for the purpose of learning a compact mathematical representation of the skill, which may then be used (for example by control device 106) for the purpose of reproducing this skill using the robot in new scenarios (for example, in new relative positions between the robot and object to be manipulated).

Various exemplary embodiments are based on the technical advances in two areas: firstly, the tracking of a hand based on camera images in areas where robots are used, for example, in factories, is typically available, and secondly, methods for training robots based on human demonstrations enable both the efficient learning by the robot (i.e., training of the robot) as well as the flexible reproduction. One example thereof is TP-HSMMs (task-parameterized hidden semi-Markov models), which enable a task parameter-dependent representation of learned movement skills.

The tracking of objects and human hands is an active area of research (in particular in machine vision) and is of major importance for industrial applications. In contrast to the application of corresponding technologies to the human-machine interaction (such as, for example, for video games), it is used according to various specific embodiments for the training (instruction) and learning of robots.

In one demonstration phase, a user (or generally a demonstration entity) demonstrates the desired skill. The demonstration is recorded. For example, a video recording is prepared with the aid of a camera and the sequence of the positions of a hand of the user (generally of a part of the demonstration entity) is ascertained from the images of the video and represented in the form of a trajectory. This is repeated for multiple demonstrations 402. It should be noted that this may take place in a decoupled manner, i.e., for example, a set of videos is used, which have been recorded beforehand with no intention of teaching a robot a skill.

In a learning or training phase, a mathematical model is trained from the collected demonstrations. For example, a TP-HSMM is learned, which includes a hand pose as one of the task parameters. A "pose" includes, for example, information about position and/or orientation or also about state (for example, "hand closed" versus "hand open").

Figure 5:
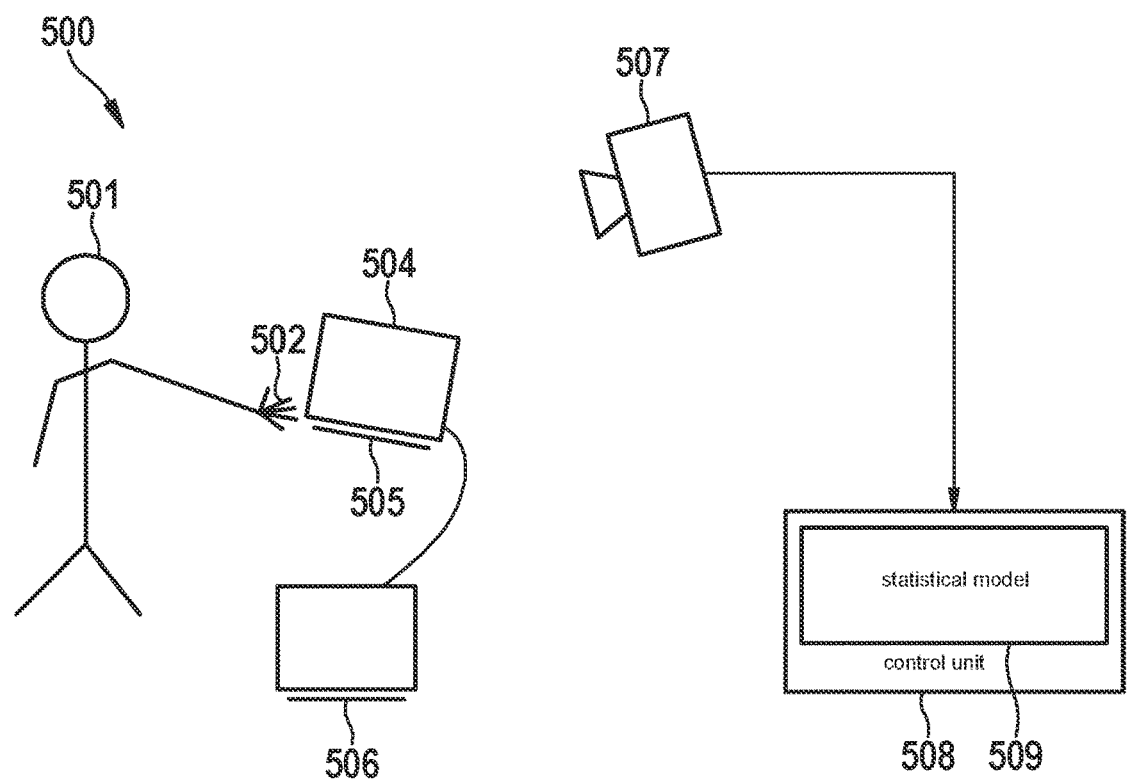
FIG. 5 shows an arrangement for recording demonstrations of a user according to various specific embodiments of the present invention.

FIG. 5 shows an arrangement 500 for recording demonstrations of a user according to various specific embodiments.

A user 501 demonstrates a skill by moving his/her hand 502. For example, he/she takes an object 504 from a first position 505 and moves it to a second position 506. A camera 507 records the movement of the user. Multiple cameras may also be provided, which record the demonstration from various view angles, in particular, from the perspective of start position 505 and from the perspective of end position 506 of object 504.

Each demonstration is thus represented as a sequence of images, which is fed to a control unit 508, which corresponds, for example, to control device 106. Control unit 508 may include a computer, for example, in order to carry out calculations. Control unit 508 learns a statistical model 509 based on the demonstrations such as, for example, robot trajectory model 404 and/or TP-GMMs 406 (for example, the precondition model and the end condition model as described herein). It is further assumed that each demonstration is recorded from the perspective P of different coordinate systems TP, which are referred to as task parameters.

At the end of the demonstration phase, for example, the demonstrations may be abstracted (represented for example, as curves of coordinates of hand 502 or of object 504) and may be stored as trajectories (for example of hand 502, subject 504 or also of multiple hands and/or of multiple objects), for example, in a memory of control unit 508.

Referring to FIG. 4, a TP-HSMM enables both efficient learning as well as flexible reproduction for learning robot capabilities from human demonstrations. More precisely, the recorded trajectory of user hand 502 is treated as a desired movement, which is intended to be learned, whereas the trajectory of object 504 is used for the purpose of generating different task parameters for the skill, which represent different configurations of the work area. The task parameters may, for example, be ascertained based on the present state. The task parameters may, for example, be freely selected.

According to various specific embodiments, a robot trajectory model 404 may be ascertained using demonstrations 402. Robot trajectory model 404 may be a TP-HSMM.

An HSMM (hidden semi-Markov model) expands a simple HMM (hidden Markov model) to the extent that pieces of temporal information are embedded into the underlying stochastic process. This means that whereas in the case of an HMM it is assumed that the underlying statistical process has the Markov characteristic, i.e., the probability of transitioning into the next state, is a function only of the instantaneous state, in the case of an HSMM, the probability of transitioning into the next state is a function of the instantaneous state and of the duration in the instantaneous state. HSMMs are typically applied, in particular, in speech synthesis.

A task-parameterized HSMM (TP-HSMM) such as, for example, robot trajectory model 404, is represented according to one specific embodiment by $$\theta = \{\{a_{hk}\}_{h=1}^{K}, (\mu_k^D, \sigma_k^D), \gamma_k\}_{k=1}^{K} \quad (6)$$

$a_{hk}$ referring to the transition probability of state h into state k, $(\mu_k^D, \sigma_k^D)$ referring to the Gaussian distributions for the duration in state $k$ (the superscript D in this case is not an index but is intended only to indicate the connection to the duration) and $\gamma_k$ being the k-th component of an (associated) TP-GMM (task-parameterized Gaussian mixed model)

$$\gamma = \{\pi_k, \{\mu_k^{(p)}, \Sigma_k^{(p)}\}_{p=1}^{P}\}_{k=1}^{K},$$

K referring to the number of Gaussian components in the mixed model, $\pi_k$ referring to the a priori probability for the k-th component and $\mu_k^{(p)}$, $\Sigma_k^{(p)}$ being the mean value or the covariance of the k-th component in coordinate system p∈TP.

The TP-GMM describes the output probabilities (or emission probabilities, i.e., probabilities for the observations) for each state k=1, ... K. Such a mixed model may (in contrast to simple GMMs) not be learned independently for each coordinate system. The reason is that the mixed coefficients $\pi_k$ are shared by all coordinate systems (i.e., apply to all coordinate systems) and the k-th component in coordinate system p must correspond to the k-th component in the global coordinate system. One possibility of learning (i.e., to train) such models is the EM (Expectation Maximization) algorithm.

When a TP-GMM is trained, it may be used by control unit 508 and/or control device 106 during the execution for the purpose of reproducing a trajectory for a learned ability or skill.

The a priori probabilities $\pi_k$ in an HSMM, however, describe only the probability distribution for the initial components where t=1. The probabilities at later points in time are given by the underlying semi-Markov model.

In this considered TP-HSMM, each state corresponds to a Gaussian component in the associated TP-GMM.

The robotic device 101 may operate in a static, known work environment. Within the range of robotic device 101 (referred to in some aspects as robot), there are objects (of interest), which are identified with O={$o_1, o_2, \ldots, o_J$}. Each object may be described by its state po.

It is further assumed that there is a set of core manipulation skills, which enable the robot to manipulate (for example, to move) the objects. The set of these core manipulation skills is identified as A={$a_1, a_2, \ldots, a_H$}.

For each activity (corresponding to a skill) user 501 carries out multiple demonstrations, which define how robotic device 101 is to carry them out. For a skill a∈A, an object set $O_a \subseteq O$, in particular, is involved and the set of demonstrations is identified with $D_a = \{D_1, \ldots, D_{M_a}\}$, each demonstration being identified with $$D_m = [s_t]_{t=1}^{T_m} = [(r_t, \{p_{t,o}, o \in O_a\})]_{t=1}^{T_m} \quad (7),$$

r being the state of end effector 104, $D_m$ being a sequence of states s, each state indicating the desired state r (at the point in time t), as it has been ascertained from the tracking of the hand (by recording camera images), and object states {$p_o$, o∈$O_a$}. With the aid of a combination of these skills, robotic device 101 is able to manipulate respective objects in such a way that they reach a desired end state.) With reference to TP-MMS $\gamma = \{\pi_k, \{\mu_k^{(p)}, \Sigma_k^{(p)}\}_{p=1}^{P}\}_{k=1}^{K}$, each p may be one task parameter of a set of task parameters TP. Each skill a∈A may be assigned at least one set of task parameters $TP_a$. For example, a skill a (E A may be executed using a set of task parameters $TP_a$. According to various specific embodiments, a respective set of task parameters $TP_a$ may be described with the aid of union set $TP_a = O_a \cup F_a \cup \{r\}$, $F_a$ being a set of free task parameters of skill a∈A.

The TP-HSMM is trained (for example, by control unit 508) in the learning phase based on demonstrations $$D_m = [s_t]_{t=1}^{T_m} = [(T_t, \{p_{t,o}, o \in O_a\})]_{t=1}^{T_m}$$

of user 501, for example, according to an EM (Expectation Maximization) process.

The result of the training are values for parameter set $$\theta = \{\{a_{hk}\}_{h=1}^{K}, (\mu_k^D, \sigma_k^D), \gamma_k\}_{k=1}^{K},$$

which characterize the TP-HSMM.

According to various specific embodiments, control device 106 is able to control robot 101 using TP-HSMM robot trajectory model 404 in order to carry out an activity, for example, for a new scenario. For example, control device 106 may use robot trajectory model 404 in order to ascertain a reference trajectory for the new scenario, and controls robotic device 101 in such a way that the latter follows this reference trajectory. The term "scenario" in this case refers to a specific selection of the modeled task parameters (for example, start position 505 or present position and target position 506; for example, present state and target state).

According to various specific embodiments, one or multiple TP-GMMs 406 may be ascertained (for example, with the aid of control device 508). For example, a precondition model $\gamma_{1,a}$ may be trained or learned in the learning phase. For example, an end condition model $\gamma_{T,a}$ may be trained or learned in the learning phase.

Precondition model $\gamma_{1,a}$ may be a TP-GMM 406. Precondition model $\gamma_{1,a}$ may be described by $$\gamma_{1,a}(s, p_F) \triangleq \{(\mu_{1,o}^{(p)}, \Sigma_{1,o}^{(p)}), \forall p \in TP_a \setminus \{o\}\}_{o \in O_a \cup F_a} \quad (8)$$

$p_F$ being the optimal free task parameters, $(\mu_{1,o}^{(p)}, \Sigma_{1,o}^{(p)})$ being the Gaussian distribution (mean value and covariance of the Gaussian distribution) of the initial pose of object o∈$O_a$ at point in time 1 from the perspective of the initial pose of object p's at initial point in time 1. As illustrated, precondition model $\gamma_{1,a}$ describes (for example, models) the state of the system before the execution of skill a.

End condition model $\gamma_{T,a}$ may be a TP-GMM 406. End condition model $\gamma_{T,a}$ may be described by $$\gamma_{T,a}(s, p_F) \triangleq \{(\mu_{T,o}^{(p)}, \Sigma_{T,o}^{(p)}), \forall p \in TP_a\}_{o \in O_a} \quad (9),$$

$(\mu_{T,o}^{(p)}, \Sigma_{T,o}^{(p)})$ being the Gaussian distribution (mean value and covariance of the Gaussian distribution) of the final (for example, resulting) pose of object o∈$O_a$ at point in time T from the perspective of the initial pose of object p's. As illustrated, end condition model $\gamma_{T,a}$ describes (for example, models) the change of the state of the system after the execution of skill a.

According to various specific embodiments, a skill-specific diversity $\mathcal{M}_a$ may be described with the aid of TP-HSMM robot trajectory model 404, of precondition model $\gamma_{1,a}$, and of end condition model $\gamma_{T,a}$ according to equation (10):

$$\mathcal{M}_a = (\theta_a, \gamma_{1,a}, \gamma_{T,a}) \quad (10).$$

As illustrated, TP-HSMM robot trajectory model 404 describes (for example, models) the trajectory of a skill a. As illustrated, precondition model $\gamma_{1,a}$ and end condition model $\gamma_{T,a}$ describe (for example, model) the geometric relationships between robotic device 101 and objects o∈$O_a$. As illustrated, precondition model $\gamma_{1,a}$, end condition model $\gamma_{T,a}$ and TP-HSMM robot trajectory model 404 form a skill database.

More details on learning from demonstrations, for example, with respect to the training of robot trajectory model 404 as TP-HSMM and the training of precondition model $\gamma_{1,a}$ and of end condition model $\gamma_{T,a}$ (also referred to in some aspects as effect model) are described in reference [1].

Figure 6A:
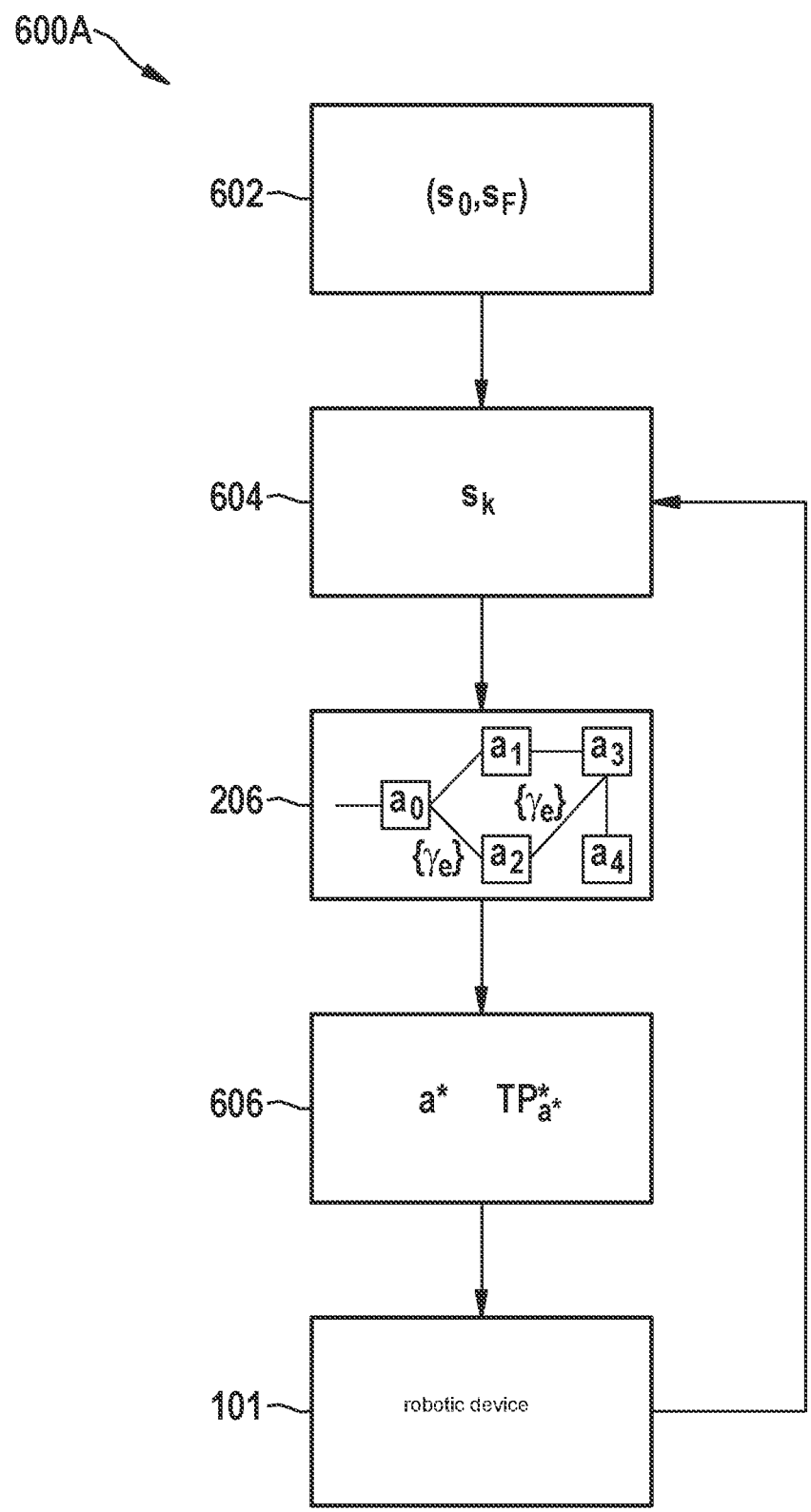
FIG. 6A and FIG. 6B each show a flowchart for controlling a robotic device according to various specific embodiments of the present invention.

FIG. 6A shows a flowchart 600A for controlling a robotic device according to various specific embodiments. Flowchart 600A may be a flowchart for controlling robotic device 101 during operation.

According to various specific embodiments, a target state $S_F$ may be provided in an initial state $S_0$ of robotic device 101, for example, may be input with the aid of a user interface. For example, control device 106 may ascertain the present state of robotic device 101 as initial state $S_0$. For example, target state $S_F$ may be provided to control device 106. For example, control device 106 may ascertain target state $S_F$ (for example, based on an input of a user, for example, based on a task to be carried out by robotic device 101, etc.). Thus, initial state-target state pair $(S_0, S_F)$ 602 may be provided in an initial state of robotic device 101. Robotic device 101 may be in a present state $S_K$ 604 at any point in time starting with initial state $S_0$ up to target state $S_F$.

According to various specific embodiments, generated control model 206 may provide (for example, output) data 606 for executing a skill a* in response to an inputting of present state $S_K$ 604 and of target state $S_F$. According to various specific embodiments, generated control model 206 may provide a state transition to be executed (for example, a skill to be executed) a* and an assigned set of task parameters $TP^*_{a^*}$ in response to an inputting of present state $S_K$ 604 and of target state $S_F$. In initial state $S_0$, control model 206 may ascertain skill a* to be executed and set of parameters $TP^*_{a^*}$ assigned to skill a* to be executed using a virtual initial skill $\underline{a}$.

According to various specific embodiments, control model 206 may ascertain, using the set of skill transitions E, all possible skills a $\ell$ for a last executed skill $a_k$, which may be executed next, for example, all skill transitions $(a_k, a\ell)$ defined in the set of skill transitions E. According to various specific embodiments, control model 206 may ascertain (for example, with the aid of the trained parameter model) a respective set of task parameters for each state transition implementable in one state in response to an input of the target state and of the state transition, with which the state has been reached. According to various specific embodiments, control model 206 may, using parameter model $\gamma_p$ for each potential skill transition $(a_k, a\ell)$ ascertain for each task parameter $p \in TP_a \ell$ of the skill a $\ell$ the optimal task parameters, provided by the set of optimized (for example, optimal) task parameters $TP^* \ell_{,p}$ of skill a $\ell$, according to equation (11):

$$TP^\star_{a_\ell,p} = \mathrm{argmax}_{p_{a_\ell,p}} \{pdf(p_{a_\ell,p} \mid \gamma_p(s_k, s_F))\}, \quad (11)$$

pdf being the probability density function of a multivariate Gaussian distribution. As illustrated, the respective optimal task parameter is the mean value (referred to in some aspects as expected value) of the Gaussian distribution of the respective task parameter ascertained with the aid of parameter model $\gamma_p(s_k, s_F)$. Parameter model $\gamma_p$ may be ascertained for respective potential skill transition $(a_k, a\ell)$ with the aid of mapping function $f$.

According to various specific embodiments, control model 206 may ascertain (for example, with the aid of the trained object model) for each state transition executable in a state a respective probability distribution for each object of the one or multiple objects in response to an input of the target state, to the respective states of the other objects of the one or multiple objects and of the ascertained set of task parameters. According to various specific embodiments, control model 206 may ascertain for each potential skill transition $(a_k, a\ell)$ using the set of optimized (for example, optimal) task parameters $TP^* a_\ell$ ascertained for the respective potential skill transition $(a_k, a\ell)$ a transition probability $\rho_{a_k} a\ell (s_k, s_F)$ according to equation (12):

$$\rho_{a_k} a_\ell (s_k, s_F) \propto \mathrm{Harmonic\text{-}Mean}(\{pdf(s_{k,o} \mid \gamma_o(s_{k,\sim o}, TP^* a_\ell, s_F)), o \in Oa_\ell\}) \quad (12)$$

Harmonic-Mean being the harmonic mean value function and $s_{k,o}$ being the observation of the present state of object $o \in Oa_\ell$. Object model $\gamma_o$ may be ascertained for the respective potential skill transition $(a_k, a\ell)$ with the aid of mapping function $f$. Object model $\gamma_o$ may ascertain for the state of the other objects $s_{k,\sim o}$ as object $o \in O_{a_\ell}$, the ascertained set of optimized task parameters $TP^* a_\ell$ and the target state $S_F$, the Gaussian distribution assigned to the present state of object $s_{k,o}$. Thus, the harmonic mean value function considers all objects $o \in O_{a_\ell}$. As a result, transition probability $\rho_{a_k} a_\ell (s_k, s_F)$ or respective skill $a_\ell$ is low if one object of objects $o \in O_{a_\ell}$ with respect to the other objects is significantly different from the learned relationships (for example, which are described with the aid of learned object model $\gamma_o$).

According to various specific embodiments, skill a* to be executed may be ascertained based on potential skill transitions $(a_k, a\ell)$ according to equation (13):

$$a^* = \mathrm{argmax}_{a_\ell} \{\rho_{a_k} a_\ell\} \quad (13).$$

As illustrated, skill a* to be executed may be skill $a_\ell$ having the highest transition probability $\rho_{a_k} a_\ell (s_k, s_F)$. As illustrated, a transition probability is ascertained for all skills $a_\ell$ executable in a present state $S_K$ 604 and the executable skill having the highest transition probability is ascertained as skill a* to be executed.

According to various specific embodiments, robotic device 101 may be controlled in accordance with control model 206. According to various specific embodiments, robotic device 101 may execute (for example, carry out) skill a* to be executed using assigned set of task parameters $TP^*_{a^*}$. The execution of skill a* results in a new state $S_K$ 604 of robotic device 101. According to various specific embodiments, control model 206 may, in response to the inputting of respective present state $S_K$ 604 and of target state $S_F$, provide data 606 for executing respective skill a*, and robotic device 101 may execute skill a* to be executed using assigned set of task parameters $TP^*_{a^*}$ until present state $S_K$ 604 corresponds to target state $S_F$.

Flowchart 600A for controlling robotic device 101 may be described with the aid of algorithm 2:

Algorithm 2: Operating a robotic device

Input: $\mathcal{G}$, $(s_0, s_F)$, $s_t$.
Output: $\{(a_k, TP_{a_k})\}$.

-continued

Algorithm 2: Operating a robotic device

Set $a_k \leftarrow \underline{a}$ and $s_k \leftarrow s_0$.
as long as $s_k \neq s_F$ do
| for all $(a_k, a_l) \in E$ do
| | calculate $TP_{al}^*$ according to equation (11)
| |_ calculate $\rho_{a_k a_l}(s_k, s_F)$ according to equation (12).
| Execute $a^* = \text{argmax}_{a_l} \{\rho_{a_k a_l}\}$ with assigned task parameters
| $TP_{a^*}^*$
|_ Set new state $s_k \leftarrow s_t$ and $a_k \leftarrow a^*$ $s_t$ being a respective state of the robotic device.

Figure 6B:
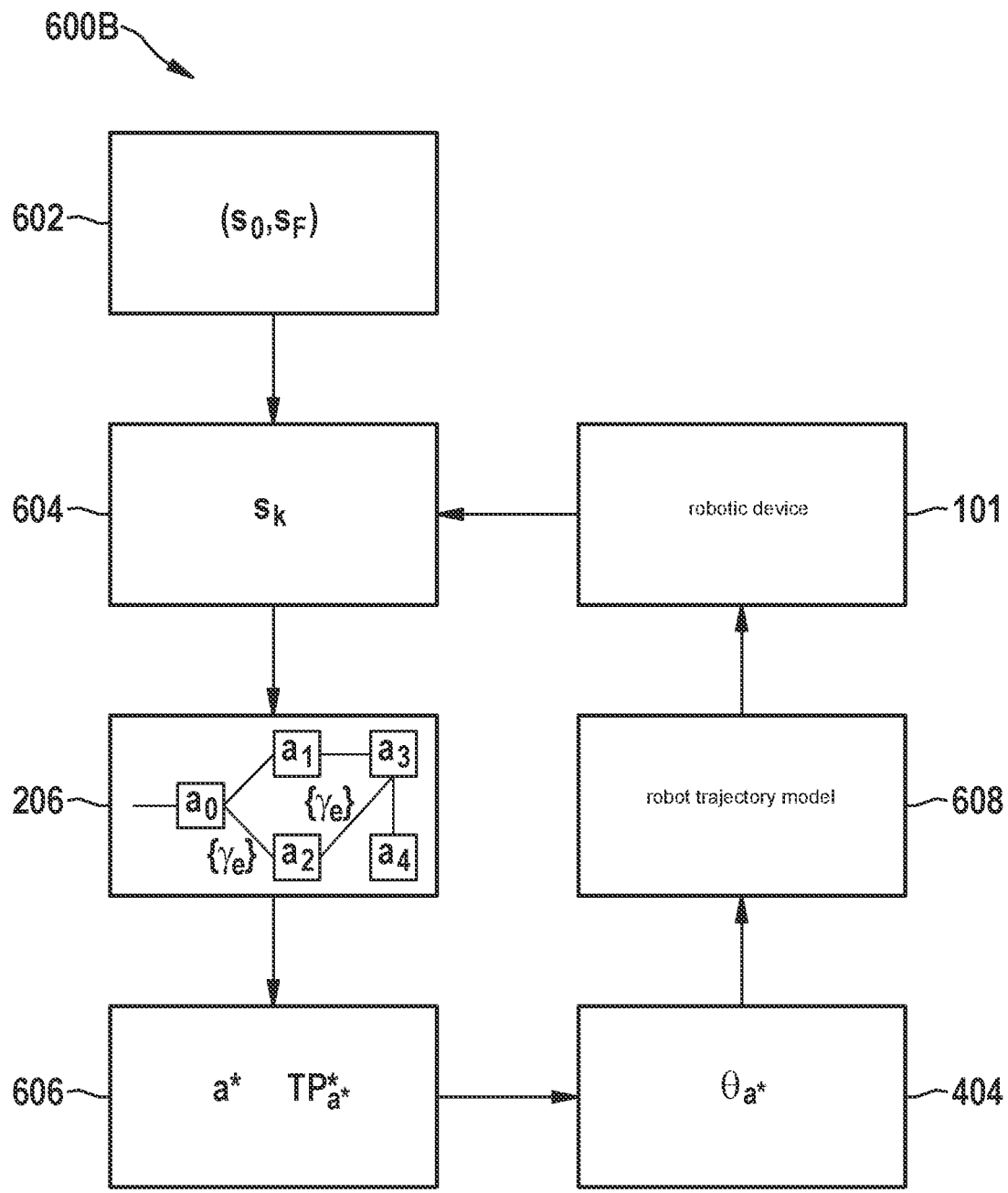

FIG. 6B shows a flowchart 600B for controlling a robotic device 101 according to various specific embodiments. Flowchart 600B may correspond essentially to flowchart 600A, control device 106 (for example, computer 110 of control device 106) being able to ascertain a robot trajectory 608 to be carried out for skill $a^*$ to be executed using robot trajectory model 404 $\theta_{a^*}$.

In this case, robot trajectory model 404 learned with the aid of demonstrations may be used to control robotic device 101 in such a way that the latter executes the skill within a demonstrated scenario or also within a non-demonstrated scenario.

According to various specific embodiments, control device 106 may ascertain, using skill $a^*$ to be executed and the assigned set of task parameters $TP^*_{a^*}$, the most probable state sequence $k^* = k_0 k_1 \ldots k_T$ for HSMMs, by which $k_t \in \{1, \ldots, K\}$, including the at a point in time $T_{[sic]}$ (for example taking the temporal sequence into account) with the aid of the Viterbi algorithm. TP-HSMM robot trajectory model 404 includes, as illustrated, the information on how the states of the TP-GMMs are to be temporally passed through (provided by the probability distributions for the duration in each state and the transition probabilities between the states). For each state $k_t$, control device 106 ascertains a corresponding end effector state $r_t$, for example, according to a LQG (Linear Quadratic Gaussian) control. In the process, it may take mean value $p_t$ of the respective TP-GMM component as a reference for each state. Control device 106 ensures that the differences between successive $r_t$ are not too great (according to the selected controller parameters). During the execution, the robot attempts to follow $r_t$, $k_t$ is only an intermediate variable. In this way, control device 106 is able to ascertain a reference trajectory $r^*$ (for example, a robot trajectory 608 to be executed). In general, $k^*$ may be considered to be the desired state sequence and control device 106 may control robotic device 101, so that robotic device 101 follows this reference as well as physically possible. Control device 106 may control robotic device 101 for executing the ascertained robot trajectory.

Figure 7:
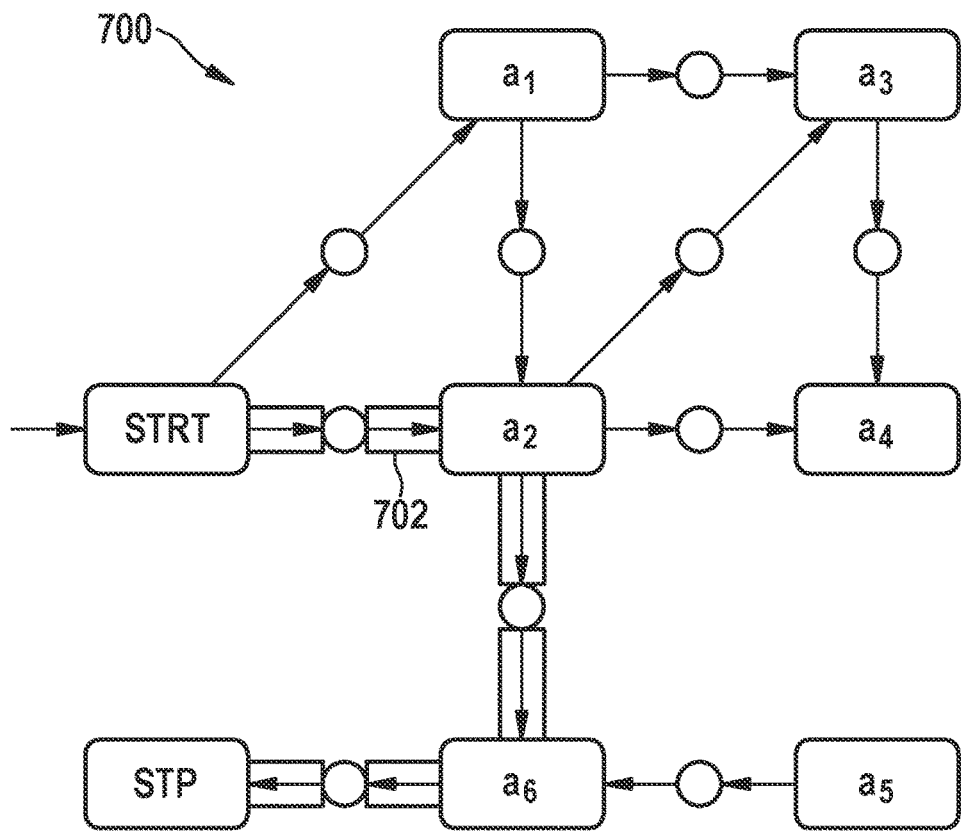
FIG. 7 shows by way of illustration an operating mode of control model for an exemplary task according to various specific embodiments of the present invention.

FIG. 7 shows by way of illustration an operating mode of a control model 206 for an exemplary task 700 according to various specific embodiments. Robotic device 101 may be in an initial state ("STRT") and a target state ("STP") may be provided (see for example, 602 in FIG. 6A and FIG. 6B). Using the set of skill transitions E, control model 206 is able to ascertain skill $a_1$ and skill $a_2$ as potential possible executable skills, in this example, skill $a_2$ being ascertained as skill $a^*$ to be executed. Robotic device 101 may execute skill a2 and in this way arrive at a new state. Control model 206 may ascertain for the new state skill $a_3$, skill $a_4$ and skill $a_6$ as potential possible executable skills, in this example, skills $a_6$ being ascertained as skill $a^*$ to be executed. For example, target state ("STP") may be achieved by executing skill $a_6$. In this way, robotic device 101 may execute a control state sequence 702 from the initial state up to the target state.

Figure 8:
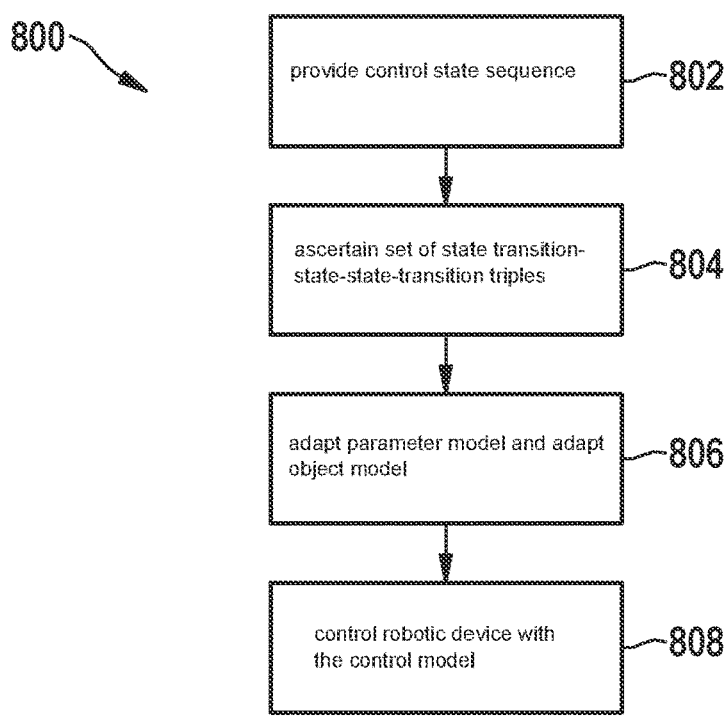
FIG. 8 shows a method for controlling a robotic device according to various specific embodiments of the present invention.

FIG. 8 shows a method 800 for controlling a robotic device according to various specific embodiments.

Method 800 may include a training of a control model (in 802 through 806). The control model may include a parameter model and an object model.

The training of the control model may include (in 802) providing for each initial state-target state pair of a plurality of initial state-target state pairs a control state sequence that includes states and state transitions from a set of possible states and state transitions. The initial state may indicate a state of the robotic device and one or multiple objects. The target state may indicate a state of the robotic device and one or multiple objects. Each state transition may be assigned a set of task parameters.

The training of the control model may include (in 804) an ascertainment of a set of state transition-state-state transition triples, which are contained in the provided control state sequences.

The training of the control model may include (806) for each transition state-state-transition state triple of the set of transition state-state-transition state triples an adaptation of the parameter model and an adaptation of the object model. The parameter model may be adapted in such a way that the parameter model ascertains a probability distribution for each task parameter from the set of task parameters, which is assigned to the state transition following the state in response to an input of the state transition-state-state transition triple and of the assigned target state of the control state sequence, in which the state transition-state-state transition triple is contained. The object model may be adapted in such a way that the object model ascertains for each object of the one or multiple objects a probability distribution for the state of the object in response to an input of the two state transitions of the state transition-state-state transition triple, to the respective states of the other objects of the one or multiple objects, to a set of task parameters, and of the assigned target state.

Method 800 may include (in 808) a controlling of the robotic device with the control model starting from a predefined initial state via a sequence of states to a target state to be reached. In each state, a set of task parameters may be ascertained using the trained parameter model. In each state, a state transition to be executed may be ascertained using the trained object model. In each state, the robotic device may be controlled to execute the state transition to be executed using the ascertained set of task parameters.

What is claimed is:

1. A method for controlling a robotic device, the method comprising the following steps:
   training a control model, which includes a parameter model and an object model, the training including:
   providing a control state sequence for each initial state-target state pair of a plurality of initial state-target state pairs, including states and state transitions from a set of possible states and state transitions, each initial state-target state pair including an initial state and a target state, the initial state indicating a state of the robotic device and one or multiple objects, the target state indicating a state of the robotic device and one or multiple objects, and each state transition being assigned a set of task parameters;

ascertaining a set of state transition-state-state transition triples, which are contained in the provided control state sequences;

for each state transition-state-state transition triple of the set of state transition-state-state transition triples:

adapting the parameter model for the state transition-state-state transition triple in such a way that the parameter model ascertains a probability distribution for each task parameter from the set of task parameters, which is assigned to the state transition following the state in response to an input of the state transition-state-state transition triple and of the assigned target state of the control state sequence, in which the state transition-state-state transition triple is contained, adapting the object model for the state transition-state-state transition triple in such a way that the object model ascertains for each object of the one or multiple objects a probability distribution for the state of the object in response to an input of two state transitions of the state transition-state-state transition triple, to the respective states of the other objects of the one or multiple objects, to a set of task parameters, and of the assigned target state; and controlling the robotic device with the control model starting from a predefined initial state via a sequence of states to a target state to be reached, a set of task parameters being ascertained in each state using the trained parameter model, a state transition to be executed being ascertained using the trained object model, and the robotic device being controlled to execute the state transition to be executed using the ascertained set of task parameters.

2. The method as recited in claim 1, wherein each control state sequence includes an alternating sequence of states and state transitions.

3. The method as recited in claim 1, wherein the controlling of the robotic device with the control model in each state includes:

ascertaining for each executable state transition in the state a respective set of task parameters in response to an input of the target state and of the state transition, with which the state has been reached, into the trained parameter model;

ascertaining for each state transition executable in the state a respective probability distribution for every object of the one or multiple objects in response to an input of the target state, to the respective states of the other objects of the one or multiple objects, and of the set of task parameters ascertained with the aid of the trained parameter model, into the trained object model;

ascertaining a probability of each state transition executable in the state using the probability distributions ascertained for the one or multiple objects; and ascertaining the executable state transitions with the highest ascertainable probability as the state transition to be executed.

4. The method as recited in claim 3, wherein the ascertainment of the respective set of task parameters for each state transition executable in the state includes:

ascertaining the respective probability distribution for each task parameter of the set of task parameters; and ascertaining an expected value of the respective probability distribution as the task parameter of the set of task parameters.

5. The method as recited in claim 1, wherein the provision of a control state sequence for each initial state-target state pair of the plurality of initial state-target state pairs includes:

selecting a state transition in a respective state of the robotic device starting with the initial state up to the target state; and ascertaining the set of task parameters assigned to the selected state transition and the state of the robotic device resulting from the state transition using a simulation.

6. The method as recited in claim 1, wherein the provision of a control state sequence for an initial state-target state pair includes:

ascertaining a plurality of potential control state sequences for the initial state-target state pair, each control state sequence including an alternating sequence of states and state transitions; and ascertaining the potential control state sequence having the shortest sequence of states and state transitions as the control state sequence for the initial state-target state pair.

7. The method as recited in claim 1, wherein the control model further includes, for each state transition, a robot trajectory model, a precondition model and an end condition model, and the training of the control model further includes:

providing demonstrations for carrying out every state transition of the state transitions;

training the robot trajectory model for each state transition using the demonstrations, each robot trajectory model being a hidden semi-Markov model including one or multiple initial states and one or multiple end states;

training the precondition model and the end condition model for each state transition using the demonstrations, the precondition model including for each initial state of the robot trajectory model assigned to the state transition a probability distribution of robot configurations before the execution of the state transition, and the end condition model including for each end state of the robot trajectory model assigned to the state transition a probability distribution of robot configurations after the execution of the state transition, the controlling of the robotic device with the control model in each state including:

ascertaining the set of task parameters using the trained parameter model;

ascertaining the state transition to be executed using the trained object model;

ascertaining a robot trajectory using the robot trajectory model using the state transition to be executed and the set of task parameters; and controlling the robotic device for executing the ascertained robot trajectory.

8. The method as recited in claim 7, wherein the provision of a control state sequence for an initial state-target state pair includes:

selecting a state transition in a respective state of the robotic device starting with the initial state up to the target state;

ascertaining the set of task parameters assigned to the selected state transition using the precondition model assigned to the selected state transition; and ascertaining the state of the robotic device resulting from the state transition using the end condition model assigned to the selected state transition.

9. A device configured to control a robotic device, the device configured to:

train a control model, which includes a parameter model and an object model, the training including:
  providing a control state sequence for each initial state-target state pair of a plurality of initial state-target state pairs, including states and state transitions from a set of possible states and state transitions, each initial state-target state pair including an initial state and a target state, the initial state indicating a state of the robotic device and one or multiple objects, the target state indicating a state of the robotic device and one or multiple objects, and each state transition being assigned a set of task parameters;
  ascertaining a set of state transition-state-state transition triples, which are contained in the provided control state sequences;
  for each state transition-state-state transition triple of the set of state transition-state-state transition triples:
    adapting the parameter model for the state transition-state-state transition triple in such a way that the parameter model ascertains a probability distribution for each task parameter from the set of task parameters, which is assigned to the state transition following the state in response to an input of the state transition-state-state transition triple and of the assigned target state of the control state sequence, in which the state transition-state-state transition triple is contained,
    adapting the object model for the state transition-state-state transition triple in such a way that the object model ascertains for each object of the one or multiple objects a probability distribution for the state of the object in response to an input of two state transitions of the state transition-state-state transition triple, to the respective states of the other objects of the one or multiple objects, to a set of task parameters, and of the assigned target state; and
  control the robotic device with the control model starting from a predefined initial state via a sequence of states to a target state to be reached, a set of task parameters being ascertained in each state using the trained parameter model, a state transition to be executed being ascertained using the trained object model, and the robotic device being controlled to execute the state transition to be executed using the ascertained set of task parameters.

10. A non-transitory non-volatile memory medium on which is stored a computer program for controlling a robotic device, the computer program, when executed by a computer, causing the computer to perform the following steps:
  training a control model, which includes a parameter model and an object model, the training including:
    providing a control state sequence for each initial state-target state pair of a plurality of initial state-target state pairs, including states and state transitions from a set of possible states and state transitions, each initial state-target state pair including an initial state and a target state, the initial state indicating a state of the robotic device and one or multiple objects, the target state indicating a state of the robotic device and one or multiple objects, and each state transition being assigned a set of task parameters;
    ascertaining a set of state transition-state-state transition triples, which are contained in the provided control state sequences;
    for each state transition-state-state transition triple of the set of state transition-state-state transition triples:
      adapting the parameter model for the state transition-state-state transition triple in such a way that the parameter model ascertains a probability distribution for each task parameter from the set of task parameters, which is assigned to the state transition following the state in response to an input of the state transition-state-state transition triple and of the assigned target state of the control state sequence, in which the state transition-state-state transition triple is contained,
      adapting the object model for the state transition-state-state transition triple in such a way that the object model ascertains for each object of the one or multiple objects a probability distribution for the state of the object in response to an input of two state transitions of the state transition-state-state transition triple, to the respective states of the other objects of the one or multiple objects, to a set of task parameters, and of the assigned target state; and
  controlling the robotic device with the control model starting from a predefined initial state via a sequence of states to a target state to be reached, a set of task parameters being ascertained in each state using the trained parameter model, a state transition to be executed being ascertained using the trained object model, and the robotic device being controlled to execute the state transition to be executed using the ascertained set of task parameters.

\* \* \* \* \*